Patented Jan. 9, 1940

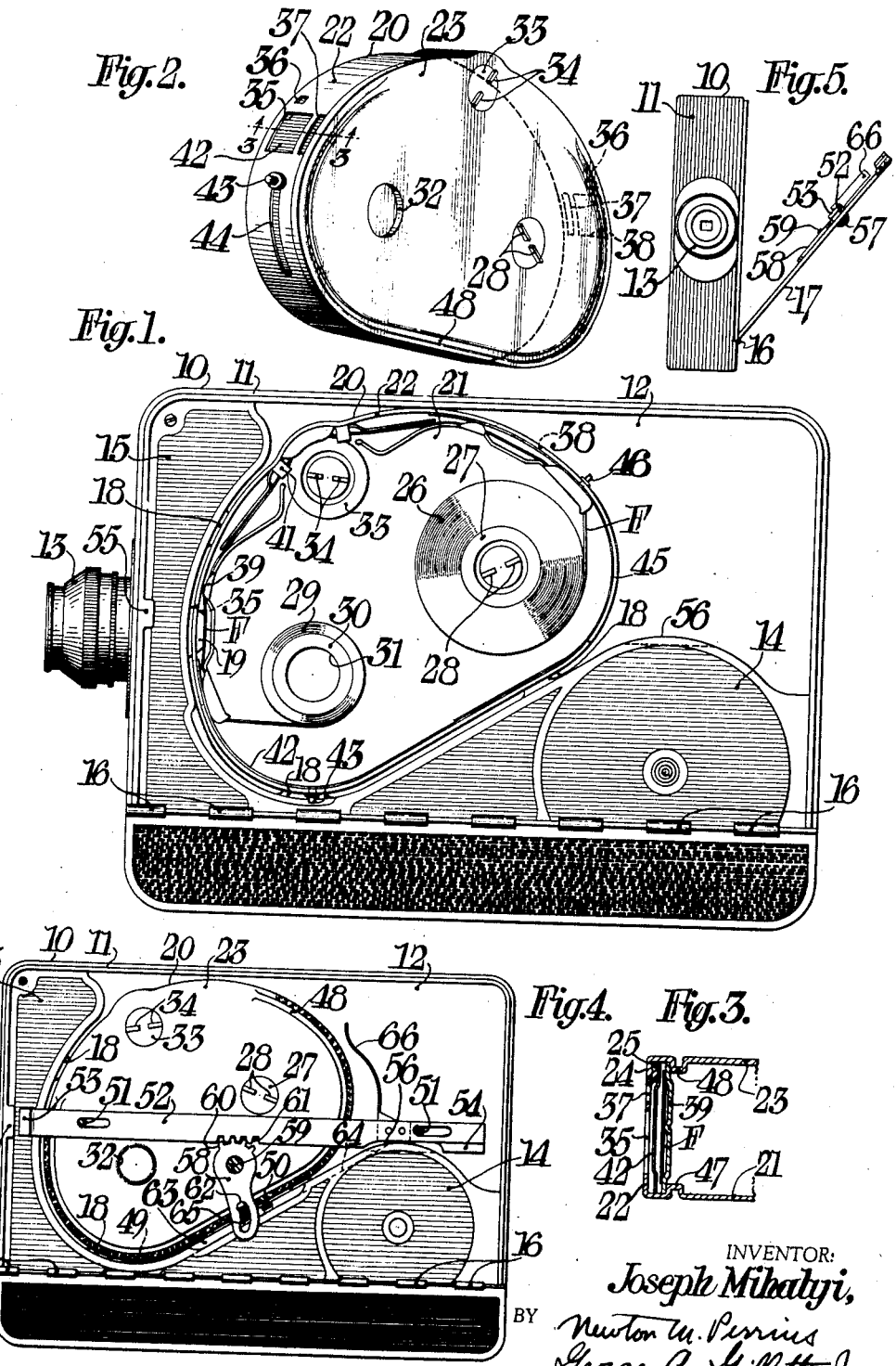

2,186,612

UNITED STATES PATENT OFFICE 2,186,612

MOTION PICTURE MAGAZINE AND CAMERA THEREFOR

Joseph Mihalyi, Rochester, N. Y., assignor to Eastman Kodak Company, Rochester, N. Y., a corporation of New Jersey Application August 22, 1935, Serial No. 37,365

4 Claims. (Cl. 88—16)

The present invention relates to motion picture apparatus of the magazine type and more particularly to motion picture magazines which are adapted for alternative exposure or projection of laterally adjacent rows of frames on a motion picture film strip.

The modern trend in the development of amateur motion picture apparatus is toward apparatus of the magazine type. Film costs to the photographer are also materially reduced by the introduction of a "Cine-8" type of apparatus whereby laterally adjacent halves of the film are exposed. The apparatus of the present invention includes both of these features and provides a film magazine which is inserted into the camera for the first run of the film or for exposure of one longitudinal half of the film strip, whereupon the film magazine is reversed for exposure of the other half of the film strip during the second run of the film through the magazine.

The prior art already includes many references to cameras of the magazine type and also includes a few references to magazines adapted to be reversed so that laterally adjacent strips of a film may be alternatively exposed in a magazine. However, the prior art structures make no provision for sealing the magazines against light leakage and for preventing fogging of the film during reversal of the magazines or upon movement of the film past exposure apertures in the magazines.

The primary object of the present invention is the provision in a magazine of one or more shutters which may completely seal the magazine against light leakage and which may be operated to uncover appropriate exposure apertures in the walls of the magazine and through which laterally adjacent portions of the film may be exposed.

Another object of the invention is the provision on the magazine of a shutter for simultaneously covering a pair of exposure apertures or for alternatively uncovering each of said apertures.

A further object of the invention is the provision on a magazine of a plurality of shutters for individual co-operation with each of the exposure apertures in the magazine and for covering and uncovering said apertures.

An additional feature of the invention is the combination with a magazine having a shutter of a motion picture camera including a latch for locking the cover of the camera and cooperating with the shutter on the magazine so that one aperture is uncovered when the magazine is placed into the camera and the cover is locked, and so that an alternate aperture is uncovered when the magazine is reversed with respect to the camera and the cover of the camera is locked.

Other and further objects of the invention will be suggested to those skilled in the art by the following disclosure:

The above mentioned and other objects of the invention are attained in a magazine which is provided with laterally displaced openings and which has one or more shutters adapted to cover and uncover the openings as desired. The shutters may be individual to each aperture or a single shutter may accomplish simultaneous covering of the apertures and alternate uncovering thereof.

The motion picture apparatus or camera for receiving such a magazine is equipped with a locking mechanism movable to locking position for fastening the cover of the apparatus, and which locking mechanism is also connected to the shutter of the magazine so that the aforementioned movement of the locking mechanism to locking position will cause the desired and alternate uncovering of the openings in the magazine.

Reference is hereby made to the accompanying drawing wherein similar reference characters designate similar elements, and wherein:

Fig. 1 is a side elevation of a motion picture camera provided with a magazine chamber for receiving a film magazine; the covers of the camera and the film magazine have been removed for better illustration of the internal parts of each apparatus.

Fig. 2 is a perspective view of a reversible film magazine according to the invention.

Fig. 3 is a fragmentary cross section through the lateral wall of the film magazine and is taken on the line 3—3 of Fig. 2.

Fig. 4 is also a side elevation of a motion picture camera provided with a magazine chamber for a reversible film magazine and provided with a locking mechanism for attaching a camera cover to the camera casing, for operating a shutter on the film magazine and for operating a spring which locates the film magazine within the camera.

Fig. 5 is a front elevation of the camera with the cover in partially opened position.

The features and advantages of the invention will be described and explained with respect to a motion picture camera, but it is to be understood that the invention may be practiced to equal advantage in any other type of motion picture equipment. The use of the invention in connection with a camera has been selected as the best example of a usage which requires sealing of the film magazine against light leakage.

The motion picture apparatus or camera may be of conventional design. The camera includes a casing 10 having a lateral wall 11, and provided with a magazine chamber 12. An objective 13 is attached to the front lateral wall 11 of casing 10. The camera also includes a spring motor 14 and conventional film advancing mechanism, not shown, but mounted beneath the cover plate 15. The camera casing 10 is provided with a plurality of hinged connections 16 to which a cover 17 is connected. The cover 17 in closed position encloses the magazine chamber 12 and makes a light-tight connection with the edges of the lateral wall 11. Said cover may be swung to the open position shown in Fig. 5 to permit removal or reversal of the film magazine.

A plurality of projections 18 extend into magazine chamber 12 for positioning the magazine, and a gate member 19 also extends into said chamber 12 for co-operation with exposure apertures in the film magazine in a manner to be later explained.

The film magazine comprises a casing 20 having a side wall 21 and a lateral wall 22 which extends around the edges of side wall 21. A cover 23 has a rim 24 for engaging, in light-tight relation, an offset portion 25 in lateral wall 22.

A film roll 26 is wound upon a core 27 which is journaled between side wall 21 and cover 23 of the magazine casing 20. One end of core 27 is provided with a pair of clutch teeth 28. A second film roll 29 is wound upon a core 30, also journaled between the wall 21 and cover 23 of the magazine but inverted with respect to core 28 so that a recess 31 in the end of core 30 rotates upon a depression 32 in cover 23. The film F extends from one film roll to the other for movement therebetween and is guided in its path by a plurality of guides next to be described.

A sprocket or roller 33 is also journaled between wall 21 and cover 23 and may engage the film to move it from one film roll to the other. The roller 33 is provided on each end with a pair of clutch teeth 34 which are driven by a clutch member on the camera, not shown. The lateral wall 22 is provided with an exposure aperture 35 which is laterally displaced with respect to the center of the lateral wall 22 and which is located with respect to the camera gate member 19 so that only one half of the film F is exposed through the objective and exposure aperture 35 in the relative positions of camera and magazine illustrated in Fig. 1. A slot 36 and an opening 37 are also provided in lateral wall 22 adjacent to the exposure aperture 35 and permit access of the camera film advancing mechanism to the perforations of the film strip F. A second exposure aperture 38 is also provided in lateral wall 22 but is off-center in relation to the magazine and in an opposite sense from the unsymmetrical location of exposure aperture 35. A slot and opening similar to slot 36 and opening 37 are also provided adjacent to exposure aperture 38. When the film magazine is in the position shown in Fig. 1, the take-up core 30 is driven in any suitable manner by the camera mechanism and, as before mentioned, exposure aperture 35 co-operates with gate member 19 for exposing one half of the film strip. After the film run has been completed, the film magazine is reversed whereupon clutch teeth 28 of core 27 are now driven by the camera mechanism and exposure aperture 38 co-operates with the camera gate member 19 so that the other half of the film strip F is now exposed.

A guide member 39 is located within the magazine so as to conduct the film along the lateral wall 22 of the magazine casing from the roller 33, past exposure aperture 35, and to the take-up roll 29. A second guide member 40 accomplishes a similar function as to the film F which is passing from the supply film roll 26 to the roller 33. A guard member 41 is mounted in relation to the roller 33 to maintain the film F in connection therewith.

The camera and film magazine thus far described do not embody any novel features over the structures disclosed in the U. S. patents to Bouveng No. 1,984,111 and to Mihalyi No. 1,994,586. However, such constructions make no provision for covering the exposure apertures to prevent fogging of the film or for providing shutters which are automatically operated to cover these apertures before the magazine is removed from the camera or reversed with respect to the camera. The provision of means to protect the film in the magazine from fogging during reversal or interchange of the magazines is the outstanding feature of the present invention and may be accomplished in several different ways, a few of which will be described hereinafter.

A flexible shutter slide 42 extends along the lateral wall 22 adjacent to the exposure aperture 35 and carries a pin 43 which extends through an elongated slot 44 provided in lateral wall 22. A second flexible shutter slide 45 is provided adjacent to the exposure aperture 38 and also carries a pin 46 which extends through lateral wall 22. The flexible shutter slides 42 and 45 may be mounted in any conventional manner for movement along the lateral wall 22 and one particular form of such mounting includes the provision of ridges 47 and 48 in side wall 21 and cover 23, respectively. These ridges 47 and 48 have the extent indicated in Figs. 2 and 4 and provide an effective but simple way of guiding the shutters 42 and 45.

The shutter 42 is moved to the position shown in Fig. 1 before the film magazine is inserted into the camera and at this time the shutter 45 lies over the exposure aperture 38 to eliminate any danger of fogging the film which is passing said aperture 38. The film magazine is inserted into the camera and the first run of the film is completed with shutters 42 and 45 in the position shown. Subsequently the camera cover is opened, the film magazine is removed, shutter 42 is closed, and shutter 45 is moved to uncover exposure aperture 38. Whereupon the film magazine is reversed and inserted into the magazine chamber of the camera for the second run of the film. After completion of the two film runs, the magazine is removed and the shutter 45 is closed to prevent light leakage or light seepage into the interior of the magazine.

It will be noted that such manually operated shutters do not prevent fogging of certain portions of the film. However, fogged portions at the ends of the film are not particularly objectionable, but if magazines are interchanged in the middle of a film run, then the entire width of the film is fogged to interrupt the succession of pictures in both directions along the film. Therefore, it is highly desirable to provide an arrangement whereby none of the film will be fogged or at least such intermediate portions of the film strip will not be fogged. Such a result can be obtained according to that modification of the invention disclosed in Fig. 4.

A single flexible shutter 49 is provided between the ridges 47 and 48 on the side wall 21 and cover 23 and is of sufficient extent to cover both of the exposure apertures. The shutter 49 carries a pin 50 which extends through a slot in the lateral wall 22 of the film magazine. In the intermediate position shown in Fig. 4, the shutter 49 covers both of the exposure apertures, but in one extreme position shutter 49 is moved to uncover the exposure aperture in line with objective 13, while in the other extreme position the shutter 49 uncovers the other exposure aperture.

The following arrangement accomplishes automatic displacement of the shutter 49 upon operation of the locking mechanism for the camera cover. The camera cover 17 carries a pair of studs 51 upon which a locking bar 52 is slidably mounted. The projections 53 and 54 upon said locking bar 52 are adapted to engage a lip 55 on the camera casing 10 and a ledge 56 on the spring motor housing, respectively. Engagement of these projections on the locking bar fastens the cover 17 in closed position. A finger piece 57, see Fig. 5, extends to the exterior of cover 17 and is attached to locking bar 52 for movement of the same from the outside of the camera. Any other conventional locking mechanism may be used to fasten the camera cover 17 to the camera casing 10.

A means is interposed between the locking mechanism and the shutter to transmit the movement of the locking bar 52 to the shutter 49. Such a means may comprise a member 58 which is pivoted upon the cover 17 by a stud 59. Member 58 has a toothed sector 60 for engaging a rack portion 61 on locking bar 52 and member 58 is provided with an arcuate slot 62. A slide 63 is mounted in a guideway 64 within the camera and carries the pin 65 which is adapted to enter the arcuate slot 62 when the cover 17 is moved to closed position.

By virtue of the arrangement just described, the film magazine may be inserted into magazine chamber 12 with both exposure apertures covered by a single flexible shutter 49. As the cover 17 is moved to closed position, a pin 65 on slide 63 enters the arcuate slot 62. As finger piece 57 is moved to fasten the locking mechanism, the member 58 is rotated through the medium of the rack portion 61 and toothed sector 60, and pin 65 is moved to the right whereupon slide 63 moves the pin 50 and shutter 49 in the same direction. This movement cannot be undertaken until the cover 17 is closed because before that time the pin 65 will not be in engagement with the arcuate slot 62. When locking bar 52 has been moved a distance such that projections 53 and 54 are in engagement with lip 55 and ledge 56, then the single shutter 49 will have been moved so that the exposure aperture adjacent to the objective and gate member of the camera will be uncovered. At the completion of the first run of film the locking mechanism is released, the shutter 49 closes the forward exposure aperture, and the cover may be opened. Upon reversal of the film magazine the locking mechanism is again operated to again uncover the exposure aperture which is in position behind the objective 13. Thus, before removal of the magazine from the camera, the exposure apertures or other openings therein must be closed and it is not possible to fog the film within the magazine.

A spring 66 is mounted upon locking bar 52 and engages the rear lateral wall 22 of the magazine upon movement of the locking mechanism to locking position. The spring 66 insures proper and accurate location of the film magazine within the magazine chamber 12.

The present invention is susceptible of many modifications but the scope of the invention is not to be limited by the disclosure but only by the scope of the appended claims.

Having now particularly described my invention, what I desire to secure by Letters Patent of the United States and what I claim is:

1. In a photographic apparatus, the combination with a casing providing a magazine chamber, and a cover for enclosing said magazine chamber, of a shutter actuating means having an element movably mounted on said cover and operative only when said cover is closed to operate the shutter member of a film magazine within said chamber, and a latching means between said casing and said cover and including a part movably mounted on said cover, operatively connected to said element of the shutter actuating means, and for opening and closing said shutter member of the film magazine when said latching means is moved respectively to lock and unlock said cover with respect to said casing.

2. In a photographic apparatus, the combination with a casing providing a magazine chamber, and a cover for enclosing said magazine chamber, of a shutter actuating means having an element movably mounted on said cover and operative only when said cover is closed to operate the shutter member of a film magazine within said chamber, and a latching means between said casing and said cover and including a locking bar movably mounted on said cover for engagement with said casing and operatively connected to said element of the shutter actuating means for opening and closing said shutter member of the film magazine when said locking bar is moved respectively into and out of engagement with said casing.

3. In a photographic apparatus, the combination with a casing providing a magazine chamber and provided with an exposure opening, a film magazine provided with a pair of displaced exposure apertures, a shutter means movably mounted on said magazine, movable to a closed position to cover said apertures and movable to an open position, and support means on said casing located to position said film magazine in either of two operative positions with one of its exposure apertures in operative relation to the exposure opening in said casing, of a cover for enclosing the magazine chamber in said casing, a latching means between said casing and cover including a part which is longitudinally movable to locking and unlocking positions, a shutter operating member on said casing for detachably engaging said shutter means in either position of said magazine and a rotatable member operatively connected between said part of the latching means and said shutter operating member and pivotally mounted for rotation by longitudinal movement of said part of the latching means to operate said shutter operating member.

4. In a photographic apparatus, the combination with a casing providing a magazine chamber and provided with an exposure opening, a film magazine provided with a pair of displaced exposure apertures, a shutter means movably mounted on said magazine, movable to a closed position to cover said apertures and movable to an open position, and support means on said casing located to position said film magazine in either of two operative positions with one of its exposure apertures in operative relation to the exposure opening in said casing, of a cover for enclosing the magazine chamber, a latching means between said casing and cover including a part having rack teeth and longitudinally movable to locking and unlocking positions, a shutter-operating member on said casing for detachably engaging said shutter means in either position of said magazine, and a rotatable member pivotally mounted, having a gear sector in engagement with said rack teeth and connected to said shutter operating member for moving the same upon longitudinal movement of said part of the latching means.

JOSEPH MIHALYI.